United States Patent [19]
Nalette et al.

[11] Patent Number: 5,681,503
[45] Date of Patent: Oct. 28, 1997

[54] FLAT SHEET $CO_2$ SORBENT

[75] Inventors: Timothy A. Nalette, Tolland; Philip J. Birbara, Windsor Locks, both of Conn.

[73] Assignee: United Technologies Corporation, Windsor Locks, Conn.

[21] Appl. No.: 472,104

[22] Filed: Jun. 7, 1995

Related U.S. Application Data

[62] Division of Ser. No. 611,211, Nov. 8, 1990, Pat. No. 5,454,968.

[51] Int. Cl.⁶ .................................................. B01D 53/04
[52] U.S. Cl. ................. 252/192; 252/190; 423/232; 244/163; 502/520
[58] Field of Search ........................... 252/193, 192, 252/190; 423/430, 232; 502/520; 244/163

[56] References Cited

U.S. PATENT DOCUMENTS

| | | | |
|---|---|---|---|
| 224,240 | 2/1880 | Stearns | 423/422 |
| 264,044 | 9/1882 | McCrodden | 423/233 |
| 1,111,055 | 9/1914 | Garveth et al. | 423/230 |
| 1,961,878 | 2/1934 | Gilkey | 423/245.3 |
| 3,511,595 | 5/1970 | Fuchs | 423/233 |
| 3,660,023 | 5/1972 | Frevel et al. | 423/230 |
| 3,865,924 | 2/1975 | Gidaspow et al. | 423/230 |
| 5,454,968 | 10/1995 | Nalette et al. | 252/192 |

OTHER PUBLICATIONS

Study of $CO_2$ Sorbents for extra Vehicular Activity, Colombo G.V., Jul. 1973 Nasa, (Jul. 1973).

*Primary Examiner*—Sharon Gibson
*Assistant Examiner*—Valerie Fee

[57] ABSTRACT

A technique for preparing a flat sheet, high capacity $CO_2$ sorbent and sorbent assembly is disclosed. The sorbent, which is in the form of a sheet, can be a metal oxide/alkali metal carbonate regenerable sorbent, while the sorbent assembly is comprised of the sheet sorbents located between constraining means and gas flow passages.

6 Claims, 2 Drawing Sheets

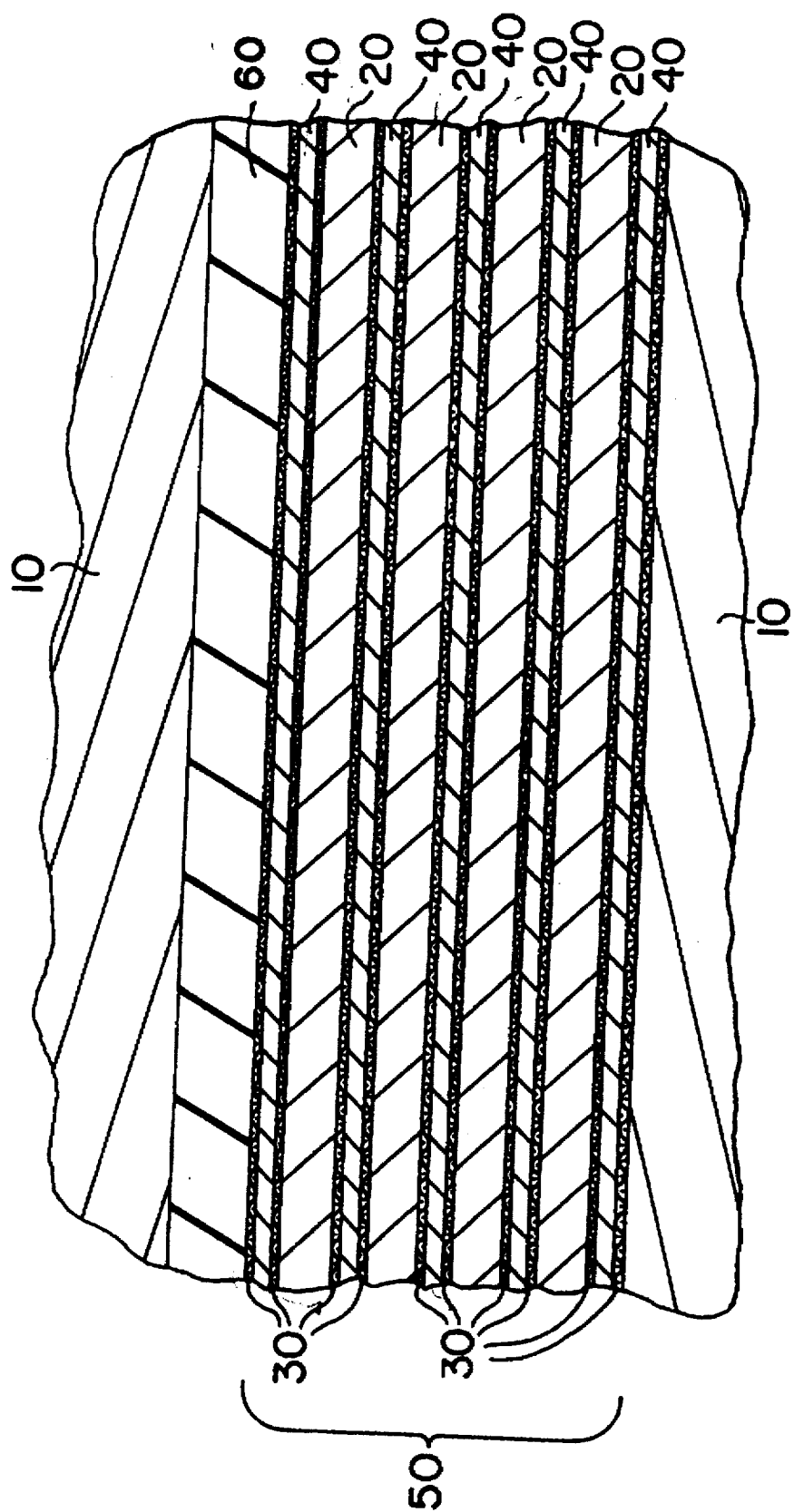

FLAT SHEET CO₂ SORBENT

This is a division of application Ser. No. 07/611,211 filed on Nov. 8, 1990, now U.S. Pat. No. 5,454,968.

TECHNICAL FIELD

The present invention relates to a sorbent, and especially to a flat sheet sorbent.

BACKGROUND ART

Maintenance of habitable conditions within closed environments often requires carbon dioxide partial pressures to remain below about 0.5%. Carbon dioxide ($CO_2$) is conventionally maintained at relatively low partial pressures via regenerable and nonregenerable $CO_2$ sorbents, such as soda lime, molecular sieves, solid oxide sorbents, and others.

$CO_2$ sorbents are prepared via paste extrusion or pelletization techniques, typically in the form of beads or pellets. Due to chemical and physical changes associated with absorption/desorption cycles of the sorbent, the life of these sorbents is limited. Cyclical operations cause volume changes in the sorbent which often result in pellet deterioration and breakage, known as "dusting". As the pellets deteriorate, the pressure drop across the sorbent bed increases, resulting in greater power requirements and a less efficient or effective sorbent bed.

Conventionally, the cyclical life of the solid $CO_2$ sorbent has been increased by the addition of binders or by depositing the active ingredients of the sorbents onto inactive supports, such as porous ceramics or carbons. These binders and supports impart strength and provide high gas/solid contact areas. However, their use is undesirable in applications where the $CO_2$ loading densities, in addition to weight, volume, and power considerations, are crucial factors. Since the binders and supports themselves are inactive, "dead" material, they merely consume volume and add weight. Therefore, in order to absorb a given amount of a substance, it is necessary to employ a greater amount of supported or bound sorbent than unsupported/unbound sorbent.

What is needed in the art is an unsupported sorbent having high loading densities, high $CO_2$ sorption rates, and extended cyclical life.

DISCLOSURE OF INVENTION

The present invention relates to a $CO_2$ sheet sorbent for the absorption of $CO_2$. The sheet sorbent comprises a mixture of metal carbonate and alkali metal carbonate formed into a flat sheet and constrained by a constraining means. The sorbent is essentially free of inert material.

This invention also relates to a method for preparing said sheet sorbent. The method comprises preparing a paste-like mixture metal carbonate and alkali metal carbonate, forming the mixture into a sheet, and constraining the sheet within a constraining means.

The present invention further discloses a sheet sorbent assembly. This assembly is comprised of sorbent sheets having sufficient thickness so as to permit sufficient gas permeation rates, means for constraining said sheet sorbents to decrease dusting and inhibit breakage, and a means for providing gas flow passages which allows contact between the sheet sorbents and a gaseous stream.

Additionally, disclosed is a method for removing $CO_2$ from a gaseous stream. The gaseous stream is passed through a sorbent sheet assembly having constrained metal oxide/alkali metal carbonate and means for providing gas flow passages to allow contact between the sorbent sheets and the gaseous stream. When the gaseous stream contacts the sorbent sheets, the alkali metal carbonate reacts with $CO_2$ in the gaseous stream to form alkali metal bicarbonate. The metal oxide, in turn, reacts with the alkali metal bicarbonate to form metal carbonate and regenerated alkali metal carbonate.

The foregoing and other features and advantages of the present invention will become more apparent from the following description and accompanying drawings.

BRIEF DESCRIPTION OF DRAWINGS

FIG. 2 is a cross sectional schematic of the sheet sorbents of the present invention constrained by retention screens and stacked alternately with heat exchanger stock fin in a reactor.

BEST MODE FOR CARRYING OUT THE INVENTION

Figure 1:
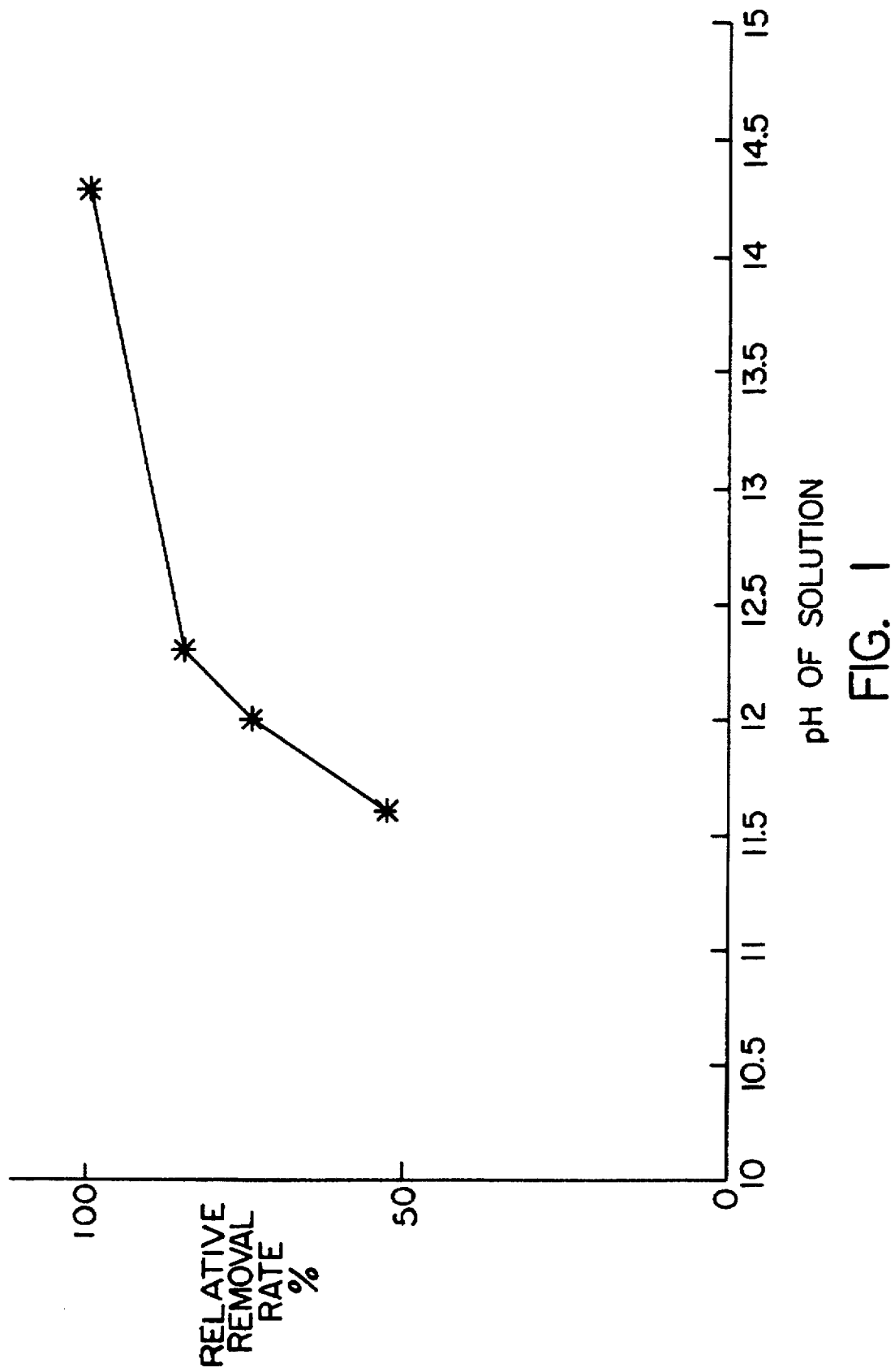
FIG. 1 is a graph of a $CO_2$ absorption test relating the $CO_2$ relative removal rate to the pH of a solution within a gas/liquid contactor.

The sorbent of the present invention is a mixture of between about 60 wt % and about 95 wt % metal carbonate and between about 5 wt % and about 40 wt % alkali metal carbonate. Between about 70 wt % and about 95 wt % metal carbonate and between about 5 wt % and about 30 wt % alkali metal carbonate is preferred, while between about 80 wt % and about 92 wt % metal carbonate and between about 8 wt % and about 20 wt % alkali metal carbonate is especially preferred.

Typically in the form of finely dispersed solid particles, known as powder, the metal carbonate can be any metal carbonate which is conventionally known in the art and is useful in $CO_2$ sorption reactions. Some possible metal carbonates include the carbonates of silver, zinc, magnesium, and mixtures thereof, with silver carbonate preferred.

As shown in FIG. 1, an absorption test preformed on an acid/gas system, the relative removal rate of $CO_2$ (sorption rate) increases as the pH of the solution increases. Metal carbonate, such as silver carbonate, is only moderately alkaline, pH of about 10, while alkali metal carbonates have pH's above about 12.5. Therefore, to enhance the $CO_2$ sorption rates, it is preferred to combine the metal carbonate with alkali metal carbonate which acts as a sorption promoter. Also typically in the form of powder, the alkali metal carbonates which are useful as sorption promoters include: cesium carbonate, potassium carbonate, sodium carbonate, and mixtures thereof.

Preparation of the sheet comprises preparing an essentially homogenous, paste or putty like mixture (hereafter referred to as paste-like) of the sorbent powder. The mixture is then formed into a flat sheet. The formation of the sheet of paste-like mixture is known and conventional techniques may be employed in this process. Some conventional techniques include, pressing, molding, and using a roller/die assembly.

For example, the paste-like mixture is formed by preparing an aqueous solution of alkali metal carbonate. The solution contains sufficient water such that upon addition of the metal carbonate powder a pliable, paste-like mixture is formed. Metal carbonate powder is then mixed into the solution to form an essentially homogenous, paste-like mixture. Mixing may be accomplished by any conventional mixing means. Note, if the mixture is not homogenous, the sorption efficiency of the sorbent sheet will be decreased. Using a roller die assembly, the paste-like mixture is formed into a flat sheet.

Although the thickness of the sheets is not critical and would be known to one of ordinary skill in the art, it is preferred that the sheet thickness be optimized to obtain maximum packing density while maintaining sufficient mass transfer or gas permeation rates. Mass transfer rates equal to or greater than the desired rate of absorption are required to maintain constant system gas partial pressures. If the mass transfer rate exceeds the rate of absorption the mass transfer zone is small and sharp break through curves are obtained. Mass transfer rates which are less than the rate of absorption require excess sorbent to maintain the desire system partial pressure. The sheet thickness can be estimated analytically based on a specific application and system parameters such as required removal rates and maximum partial pressures.

Sheet thickness can be as large as 0.25 inch or larger. For example, for a metal carbonate/alkali metal carbonate sorbent which absorbs between about 0.2 and 0.3 lbs $CO_2$/hr, a sheet thickness between about 0.01 and about 0.25 inches can be used, with a uniform thickness between about 0.04 and about 0.125 preferred due to sorption efficiency. If the sheet is too thin, below about 0.01 inches, fabrication of a uniform thickness becomes complex, and the number of sheets required to absorb a given amount of $CO_2$ increases. On the other hand, if the sorbent sheet is too thick, typically greater than about 0.25 inch, the efficiency of the sorbent decreases due to an inability of $CO_2$ to diffuse through the thick sheet to be absorbed.

The preferred liquid carrier for the formation of the metal carbonate/alkali metal carbonate paste-like mixture is water. However, any conventional liquid in which the alkali metal carbonate is inert with respect to the sorbent constituents and is removable from the mixture at a temperature below those which would damage the final sorbent, can be used. A sufficient amount of liquid is utilized such that a paste-like mixture is formed. Excess liquid can cause handling difficulty due to low viscosity. Furthermore, if excess liquid is employed, upon the removal of the liquid (activation or driving off the sorbent), sorbent free areas (voids) can be formed which reduce the packaging efficiency.

Once the sorbent is formed into a sheet, the sheets are typically constrained to minimize expansion, prevent dusting and breakage, and to provide structural integrity and ease of handling. The means for constraining the sheet sorbents can be any means which is not degraded by the sorbent and which allows gas permeation while inhibiting leakage of the sorbent mixture. Possible constraining means include retention screens and gas permeable membranes, among others, with fine mesh retention screens preferred. The screen mesh should be sufficiently smaller than the size of metal carbonate or oxide particles and alkali metal carbonate particles such that particle migration is inhibited. Screens having a mesh of at least 400 have been found suitable for use with metal oxide/alkali metal carbonate sheet sorbents.

Additionally, Teflon® coating of the screens is useful in preventing the leaching of the sorbent as a soluble salt. The hydrophobic characteristics of the Teflon inhibit water from adhering to the screens, which can cause leaching. As a result, retention screens coated with Teflon® are especially preferred.

In a sorbent sheet assembly, the constrained sheet sorbents are stacked with gas flow passages therebetween. Any means for providing gas flow passages that separates the sheets, providing cavities which permit gas/sheet sorbent contact, can be used. Suitable means include screens, metallic and nonmetallic foam, heat exchange fin stock, and other rigid porous material.

The sorbent sheet assembly can be used in a sorption process. The sorbent sheet assembly is loaded into a container for constraining the sorbent sheet assembly and also for forcing a gaseous stream through the sorbent sheet assembly (hereafter referred to as a reactor). Referring to FIG. 2, which is meant to be exemplary not limiting, a reactor is shown which contains a sorbent sheet assembly (50). The sorbent sheet assembly (50) is comprised of sheet sorbents (20), retention screens (30), and heat exchanger fin stock (40). Each sheet sorbent (20) is constrained between two retention screens (30), and between adjacent constrained screens (30) are heat exchanger fin stock (40) to allow gas flow and contact between the gas and the sheet sorbents. The sorbent sheet assembly (50) can be held firmly together via pressure or a spacer (60) between the sorbent sheet assembly (50) and one or more of the reactor walls (10).

Prior to use as a sorbent, it may be necessary to heat the sorbent to remove any remaining liquid and to convert the sorbent into a form capable of sorption, a process known as activation. For example the metal carbonate/alkali metal carbonate sheet sorbents are activated by heating the sorbent, thereby driving off any remaining water and liberating $CO_2$ by converting the metal carbonate to metal oxide. For a silver carbonate/cesium carbonate sheet sorbent, for example, this is accomplished by heating the sheet sorbent assembly to between about 160° C. and about 220° C., and then cooling. At these temperatures, the silver carbonate is converted to silver oxide, releasing $CO_2$ and water, and converting the constrained paste-like sheets into constrained porous, dry, solid sheets. Note, temperatures exceeding about 250° C. can irreversibly convert the silver carbonate to silver metal, reducing the sorbent's $CO_2$ capacity.

Once activated, a gaseous stream may be introduced to the reactor/sorbent sheet assembly. Sorption for the metal oxide/alkali metal carbonate sheet sorbent consists of introducing a $CO_2$ containing gaseous stream to the reactor. Within the reactor, the gaseous stream flows through the cavities provided by the means for providing gas flow passages. From these cavities the gaseous stream permeates the constraining means and passes through the sorbent where the $CO_2$ contacts the alkali metal carbonate. The alkali metal carbonate, such as potassium carbonate ($K_2CO_3$), and $CO_2$ react to form alkali metal bicarbonate, such as potassium bicarbonate ($KHCO_3$) (see reaction 1). The alkali metal bicarbonate further reacts with the metal oxide, such as silver oxide (AgO), to form metal carbonate, silver carbonate ($AgCO_3$), and regenerated alkali metal carbonate (see reaction 2). As a result, the alkali metal carbonate is uninhibited from continuing to remove $CO_2$ from the gaseous stream.

$$K_2CO_3 + CO_2 + H_2O \rightarrow 2KHCO_3 \qquad (1)$$

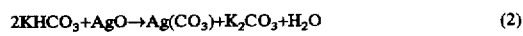

$$2KHCO_3 + AgO \rightarrow Ag(CO_3) + K_2CO_3 + H_2O \qquad (2)$$

Upon conversion of the metal oxide to metal carbonate, the sorbent pH and sorption capabilities decrease, requiring regeneration or replacement of the sorbent. Regeneration, as with activation, consists of converting the metal carbonate to metal oxide by heating the sheet sorbents and liberating $CO_2$. Again, for silver carbonate, temperatures between about 160° C. and about 220° C. are sufficient for $CO_2$ liberation.

Use of the present invention in combination with other sorbents, such as charcoal, alumina, zeolite molecular sieves, and alkali metal carbonate alone, is anticipated. As with the above described sorbent, these sorbents would be made into a paste-like consistency via the addition of water (or other liquid), formed into a flat sheet of sufficient thickness to allow mass transfer rates approximately equivalent to the desired rate of sorption, constrained within retention screens, and activated. Note, activation consist merely of driving off the liquid, and the activation temperatures may differ. Additionally, it may be beneficial to grind the sorbent to a powder-like consistency before addition of the liquid to increase the active surface area of the final sheet sorbent.

The following example is given to illustrate the method of preparing the sheet sorbents of the present invention. It is not, however, intended to limit the generally broad scope of the present invention.

EXAMPLE

The following example describes a method for producing flat sheet sorbents comprised of 12 wt % potassium carbonate and 88 wt % silver carbonate.

1. An aqueous solution of potassium carbonate was prepared by dispersing 12 g of potassium carbonate in 20 ml of water.
2. The potassium carbonate solution was mixed with 88 g of silver carbonate via an ultrasonic blender for 5 minutes, until homogenous; forming a paste-like mixture.
3. The paste-like mixture was formed into 0.040 inch thick rectangular sheets with a roller/die assembly.
4. 400 mesh Teflon coated stainless steel retention screens where used to constrain the sorbents.
5. The constrained sorbent sheets were stacked such that 0.020 inch high heat exchanger fin stock was located on each side of the sheets (see FIG. 2) forming an assembly.
6. The assembly was loaded into a reactor.
7. The sorbent sheets were activated by uniformly heating the reactor to 200° C. while purging with air until all of the silver carbonate was converted to silver oxide. An infrared analyzer was used to determine when the $CO_2$ concentrations in the effluent air was essentially zero.

At this point, the sorbent can be employed to remove $CO_2$ from a sorbent stream. Sorbent sheets prepared in the above described manner have shown to have high $CO_2$ loading densities between about 18 to about 23 lbs/ft$^3$.

The sorbent sheets of the present invention are capable of high $CO_2$ loading densities, and are relatively devoid of the low $CO_2$ sorption rates and dusting problems of the prior art. Since the sheets are constrained, it is not necessary to utilize binders, supports, or other inert material which tends to decrease the sorbent density. The sheet sorbent of the present invention is essentially free of inert material.

Prior art supported sorbents typically have $CO_2$ loading densities between about 2 and 3 lbs/ft$^3$, with dusting problems beginning at about 20 cycles (absorption/desorption), while unsupported bound sorbents have loading densities up to about 15 lbs/ft$^3$ with dusting problems often experienced in early cycles. The sorbent sheets of the present invention have shown to possess loading densities above 18 lbs/ft$^3$, typically between about 18 and 23 lbs/ft$^3$ while being devoid of dusting problems for more than 100 cycles. Comparative studies using various manufacturing techniques for metal oxide/alkali metal carbonate sorbents has shown the sheet sorbents technique as a marked improvement over other techniques. Additionally, since the sheet sorbent is unsupported, the sorbent assembly consumes minimum volume, making it especially suitable for closed environment applications.

Although this invention has been shown and described with respect to detailed embodiments thereof, it will be understood by those skilled in the art that various changes in form and detail thereof may be made without departing from the spirit and scope of the claimed invention.

We claim:

1. A method for removing $CO_2$ from a gaseous stream, which comprises: passing the gaseous stream through a sheet sorbent assembly having a $CO_2$ reactive silver oxide/alkali metal carbonate sheet sorbent essentially free of inert materials, constraining means for constraining said sheet sorbent, and means for providing gas flow passages to allow said gaseous stream to contact said sheet sorbent as said gaseous stream passes through said sheet sorbent assembly, and flowing said gaseous stream through said means for providing gas flow passages, wherein the $CO_2$ diffuses into said sheet sorbent, the alkali metal carbonate reacts with the diffused $CO_2$ to form alkali metal bicarbonate, and the reactive metal oxide reacts with the formed alkali metal bicarbonate to form metal carbonate and regenerated alkali metal carbonate.

2. A method for removing $CO_2$ from a gaseous stream as recited in claim 1 wherein said alkali metal carbonate is selected from the group consisting of cesium carbonate, potassium carbonate, sodium carbonate, and mixtures thereof.

3. A method for removing $CO_2$ from a gaseous stream as recited in claim 1 wherein said reactive silver oxide/alkali metal carbonate sheet sorbent has between about 60 wt % and 95 wt % reactive metal oxide and between about 5 wt % and 40 wt % alkali metal carbonate.

4. A method for removing $CO_2$ from a gaseous stream as recited in claim 3 wherein said reactive silver oxide/alkali metal carbonate sheet sorbent has a thickness between about 0.01 inches and about 0.25 inches.

5. A method for removing $CO_2$ from a gaseous stream as recited in claim 1 further comprising heating said formed metal carbonate to desorb $CO_2$ wherein said formed metal carbonate is converted to reactive metal oxide.

6. A method for removing $CO_2$ from a gaseous stream as recited in claim 5 wherein said sheet sorbent is heated to temperatures between about 160° C. and about 220° C. and said sheet sorbent being essentially free of dusting for greater than 100 regeneration cycles.

* * * * *